(12) United States Patent
Chavez et al.

(10) Patent No.: US 7,483,369 B2
(45) Date of Patent: Jan. 27, 2009

(54) METHOD AND APPARATUS FOR MIGRATING TO AN ALTERNATE CALL CONTROLLER

(75) Inventors: David L. Chavez, Thornton, CO (US); Kurt H. Haserodt, Westminster, CO (US); Manish Marwah, Boulder, CO (US); Jeffrey Meis, Broomfield, CO (US); Vivekananda Velamala, Thornton, CO (US)

(73) Assignee: Avaya Inc., Basking Ridge, NJ (US)

( * ) Notice: Subject to any disclaimer, the term of this patent is extended or adjusted under 35 U.S.C. 154(b) by 826 days.

(21) Appl. No.: 10/676,659

(22) Filed: Sep. 30, 2003

(65) Prior Publication Data

US 2005/0068889 A1 Mar. 31, 2005

(51) Int. Cl.
*G01R 31/08* (2006.01)
*H04L 12/50* (2006.01)
*H04L 12/28* (2006.01)
*H04M 3/22* (2006.01)
*H04M 7/00* (2006.01)

(52) U.S. Cl. .................. 370/219; 370/384; 370/410; 370/389; 379/27.02; 379/221.04

(58) Field of Classification Search .......... 370/352, 370/401, 389, 225, 216, 218, 219, 242, 356, 370/400, 412, 395.21, 468, 217; 379/52, 379/93.17, 221.04, 221.05, 221.01, 93.23
See application file for complete search history.

(56) References Cited

U.S. PATENT DOCUMENTS

| 5,206,903 A | 4/1993 | Kohler et al. |
| 5,280,561 A | 1/1994 | Satoh et al. |
| 5,828,747 A | 10/1998 | Fisher et al. |
| 5,905,793 A | 5/1999 | Flockhart et al. |
| 5,974,114 A | 10/1999 | Blum et al. |

(Continued)

FOREIGN PATENT DOCUMENTS

EP 0805576 A2 11/1997

(Continued)

OTHER PUBLICATIONS

ITU-T Recommendation H.248, "Series H: Audiovisual and Multimedia Systems," International Telecommunication Union (Jun. 2000), pp. 1-121.

(Continued)

*Primary Examiner*—Hanh Nguyen
(74) *Attorney, Agent, or Firm*—Sheridan Ross P.C.

(57) ABSTRACT

The present invention is directed to the maintenance of call signaling information in connection with realtime communications established using a packet data network. According to the present invention, call state information related to a realtime communication is provided by a call controller to an interconnected client. The client stores the call state information. In the event of a failure of a call signaling channel between the call controller and the client or in the event of a failure of the call controller, the client may establish contact with an alternate call controller, and may provide the call state information that has been stored on the client to the alternate call controller. The alternate call controller may then restore call features associated with the realtime communication.

18 Claims, 3 Drawing Sheets

U.S. PATENT DOCUMENTS

| | | | |
|---|---|---|---|
| 5,982,873 | A | 11/1999 | Flockhart et al. |
| 6,163,607 | A | 12/2000 | Bogart et al. |
| 6,173,053 | B1 | 1/2001 | Bogart et al. |
| 6,192,122 | B1 | 2/2001 | Flockhart et al. |
| 6,282,192 | B1 | 8/2001 | Murphy et al. |
| 6,292,463 | B1 | 9/2001 | Burns et al. |
| 6,314,114 | B1 | 11/2001 | Coyle et al. |
| 6,317,596 | B1 * | 11/2001 | Elwin .......................... 455/423 |
| 6,434,226 | B1 | 8/2002 | Takahashi |
| 6,504,922 | B1 * | 1/2003 | Erb ........................ 379/221.04 |
| 6,574,469 | B1 | 6/2003 | Xiang et al. |
| 6,665,375 | B1 * | 12/2003 | Forlenza et al. ................ 379/52 |
| 6,671,262 | B1 | 12/2003 | Kung et al. |
| 6,721,712 | B1 | 4/2004 | Benyassine et al. |
| 6,731,734 | B1 | 5/2004 | Shaffer et al. |
| 6,738,343 | B1 * | 5/2004 | Shaffer et al. ................ 370/216 |
| 6,801,612 | B2 | 10/2004 | Malcolm et al. |
| 6,925,076 | B1 * | 8/2005 | Dalgic et al. ................. 370/356 |
| 6,937,873 | B2 * | 8/2005 | Levy et al. ................... 455/521 |
| 6,950,874 | B2 | 9/2005 | Chang et al. |
| 6,968,382 | B2 | 11/2005 | McBrearty et al. |
| 6,973,506 | B2 | 12/2005 | Ishiyama et al. |
| 6,999,478 | B2 | 2/2006 | D'Angelo |
| 7,145,900 | B2 * | 12/2006 | Nix et al. ..................... 370/352 |
| 7,161,897 | B1 | 1/2007 | Davies et al. |
| 7,215,643 | B2 | 5/2007 | Mussman et al. |
| 7,227,927 | B1 * | 6/2007 | Benedyk et al. ............ 379/9.05 |
| 7,243,142 | B2 | 7/2007 | Poirot et al. |
| 2001/0055382 | A1 | 12/2001 | Oran et al. |
| 2003/0031137 | A1 | 2/2003 | Mecklin |
| 2003/0091024 | A1 | 5/2003 | Stumer |
| 2004/0028199 | A1 | 2/2004 | Carlson |
| 2004/0101119 | A1 | 5/2004 | Malcolm et al. |
| 2004/0143665 | A1 | 7/2004 | Mace et al. |
| 2004/0252676 | A1 | 12/2004 | Bye |
| 2005/0281216 | A1 | 12/2005 | Varonen et al. |
| 2006/0034297 | A1 | 2/2006 | O'Neill |
| 2006/0092919 | A1 | 5/2006 | Hallmark et al. |
| 2006/0146799 | A1 | 7/2006 | Baldwin et al. |
| 2006/0146859 | A1 | 7/2006 | Baldwin et al. |
| 2006/0168326 | A1 | 7/2006 | Baldwin et al. |

FOREIGN PATENT DOCUMENTS

| | | |
|---|---|---|
| EP | 0920176 A2 | 6/1999 |
| EP | 0964563 | 12/1999 |
| EP | 1250023 A1 | 10/2002 |
| EP | 1677569 A1 | 7/2006 |
| EP | 1677570 A1 | 7/2006 |
| JP | H8-320800 | 12/1996 |
| JP | H10-164240 | 6/1998 |
| JP | 2002-237896 | 8/2002 |
| JP | 2003-514439 | 4/2003 |
| JP | 2003-244204 | 8/2003 |
| WO | WO 00/72536 | 11/2000 |
| WO | WO 00/72560 A1 | 11/2000 |
| WO | WO 01/65808 | 9/2001 |

OTHER PUBLICATIONS

Kristol and Montulli, "HTTP State Management Mechanism," Oct. 2000, pp. 1-22, available at http://www.cse.ohio-state.edu/cgi-bin/rfc/rfc2965.html, printed Feb. 3, 2005.
European Search Report for Application No. EP 04 25 5375 dated Feb. 8, 2005.
L. Gavrilovska Bozinovski et al., "Fault-tolerant SIP-based call control system," Electronic Letters, vol. 29, No. 2 (Jan. 23, 2003), pp. 254-256.
U.S. Appl. No. 11/080,763, filed Mar. 14, 2005, Coughlan et al.
European Examination Report for EP Application No. 04255375.0 (Jun. 28, 2006).
Clark, William J.; "Multipoint Multimedia Conferencing"; IEEE Communications Magazine; May 1992; pp. 44-50.
Cisco Systems Overview—Cisco IOS Telephony Services: Survival Remote Site Telephony, Copyright 2001, Cisco Systems, Inc., pp. 1-4.
Cisco Systems Solutions Guide—"Survivable Remote Site Telephony Cisco 2600/3600 Voice Technical Marketing" Copyright 1992-2001, Cisco Systems, Inc., pp. 1-19.
Cisco Systems IOS Release 12.2(8)T—Survivable Remote Site Telephony, pp. 1-74 (undated).
Cisco Solutions Guide, Copyright 1992-2001, Cisco Systems, Inc., http://www.cisco.com/warp/public/cc/pd/unco/srstl/tech/demha_sg.htm (21 pages).
Cisco Systems—Survivable Remote Site IP Telephony, Copyright 1992-2003, Cisco Systems, Inc., http://www.cisco.com/warp/public/cc/pd/unco/srstl, 1 page.
Cisco Systems White Paper, Copyright 1992-2005, Cisco Systems, Inc., http://www.cisco.comlen/us/products/sw/voicesw/ps2169/products_white_paper09186a008 . . . (5 pages).
Cisco IP Telephony Solution Reference Network Design, Dial Plan, #9562230403, Chapter 8, pp. 1-70 (undated).
Lucent Technologies Merlin Legend Communications Syst, Release 6.1, Network Reference, 555-661-150 Comcode 108289703; Issue 1, Aug. 1998; 360 pages (3 parts).
"Separation of Bearer and Signaling for Avaya™ Communication Manager," Avaya, Issue 1 (May 2003) pp. 1-42.
Carroll Communications, Inc. Automatic Route Selection (ARS) Feature, at http://www.carrollcommunications.com/merlinmagix/AutomaticRouteSelection.html, 2 pages.
KXTD System—ISDN—Basic and Primary Rate Interfaces, at http://www.thetelephoneexchange.co.uk/Teleweb_files/kxtd.html, 5 pages.
Definition—automatic route selection (ARS) at http://www.atisorg/tg2k/automatic_selection_route.html, 1 page.
Acronym Finder—ARS at http://www.auditmypc.com/acronym/ARS.asp, 2 pages.
WestNet Learning—glossary for UDP, at http://glossary.westnet.com/term.php?termld=2213, 1 page.
Declaration of Michael Gruen Under 37 CFR Section 1.98; 3 pages.
European Application No. 04255375.0; Notice of Allowance dated May 31, 2007 (18 pages).
Examiner Chan, Examiner's Report for Canadian Patent Application No. 2,478,361, mailed Oct. 30, 2007, 3 pages.

* cited by examiner

METHOD AND APPARATUS FOR MIGRATING TO AN ALTERNATE CALL CONTROLLER

FIELD OF THE INVENTION

The present invention is directed to realtime data transmission over a packet data network. In particular, the present invention is directed to maintaining call state information when migrating between call controllers by storing call state information on communication endpoints.

BACKGROUND OF THE INVENTION

Packet data networks are increasingly used for the exchange of realtime audio, video and data communications. Various protocols, including the H.323 protocol, require the establishment of a call signaling channel that is separate from the bearer channel. The call signaling channel is used to exchange signaling messages, such as call setup, tear down, address translation and messages related to billing.

In connection with realtime communications over packet data networks, or IP telephony, a signaling channel is usually established over the IP network between a client (such as media gateways and IP endpoints) and a call controller for basic call service and for various call feature support. Failure of the IP network or the call controller such that the call signaling channel is lost will lead to a service outage at the media gateway or IP endpoint. In order to prevent a loss of service under such circumstances, alternate call controllers are typically provided. However, when a media gateway or IP endpoint migrates to a new call controller, the existing calls (i.e., the bearer channels) may get torn down. Even if they are not torn down, it is likely that no call features will be available to the media gateway or IP endpoint, since the alternate call controller has no knowledge of the call state information associated with the calls. In particular, preservation of call features in addition to bearer connections requires that the alternate controller be supplied with call state information.

In order to provide call state information to an alternate controller, such information can be stored in a database that can be accessed by all primary and alternate call controllers. However, establishing a common, redundant database can be expensive. In addition, such databases can create a data bottleneck, especially when a large number of controllers are accessing the database. Furthermore, such a solution is not very robust, as network failures can prevent call controllers from accessing the common database.

Another approach to providing call state information to alternate call controllers dynamically updates available alternate call controllers with call state information. That is, as call state information is generated or updated, that information is provided to the alternate call controller or controllers that would be contacted by the client if the primary call controller were lost. However, this approach adds overhead and complexity, particularly as the number of call controllers available on a system increases. In addition, the alternate call controllers must be updated with call state information regarding all of the calls on the main controller. This can result in network congestion. In addition, the solution is not very robust, as network failures can prevent controllers from communicating with one another.

SUMMARY OF THE INVENTION

The present invention is directed to solving these and other problems and disadvantages of the prior art. According to the present invention, call state information is provided from the primary call controller to the client. The client stores the state information provided by the primary call controller. If the state of the call changes, updated call state information is provided to the client. In the event of a failure of the call controller or the signaling channel, the client may provide an alternate call controller with the call state information, thus allowing the alternate call controller to provide the call features that had been provided by the primary call controller. The state information need not be in a format that the client understands and processes.

In accordance with an embodiment of the present invention, the file containing the call state information may be provided to the alternate call controller in response to a query to the client made by the alternate call controller. In accordance with another embodiment of the invention, the file containing the call state information may be pushed from the client to the alternate call controller.

DETAILED DESCRIPTION

Figure 1:
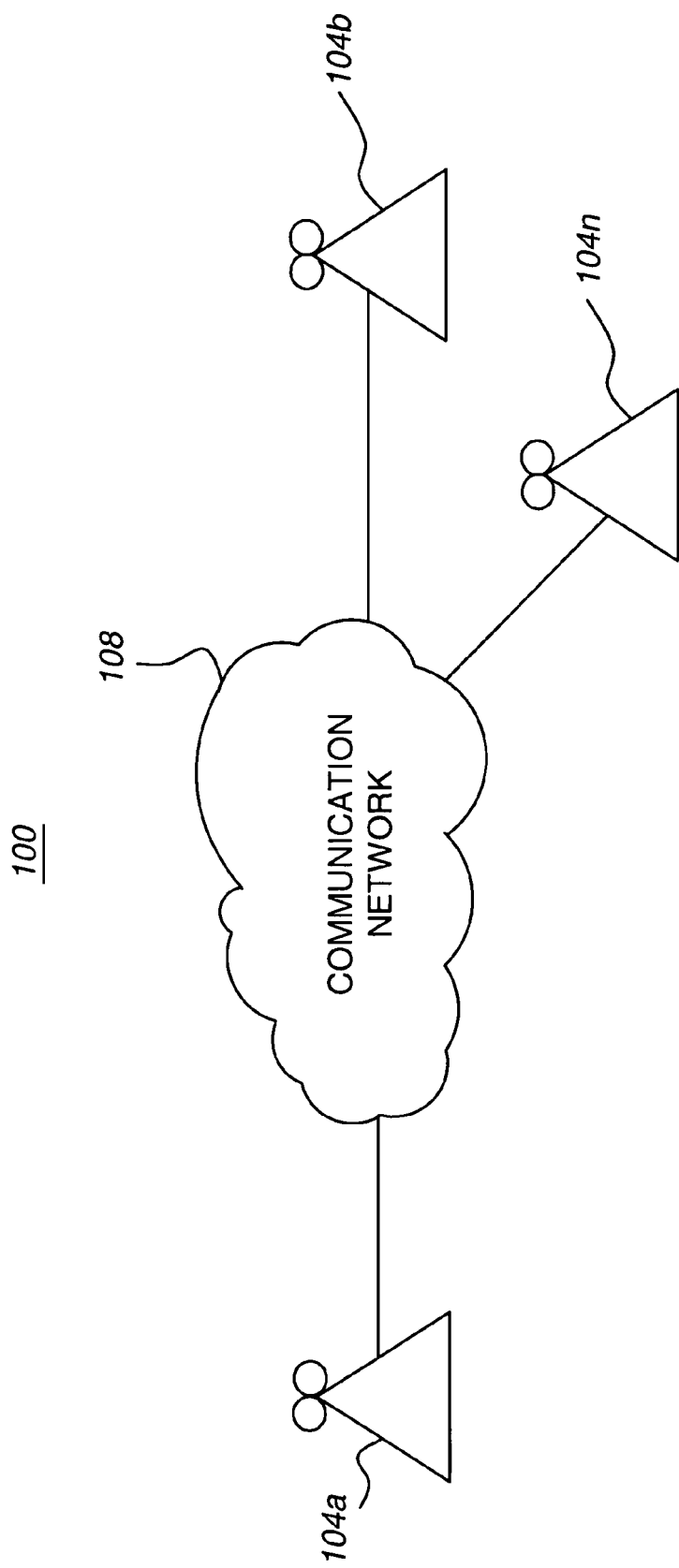
FIG. 1 depicts a realtime communication arrangement in accordance with an embodiment of the present invention.

With reference now to FIG. 1, a realtime communication arrangement 100 in accordance with an embodiment of the present invention is illustrated. In general, the communication arrangement 100 involves a number of communication terminals 104a-n interconnected to one another by a communication network 108. As can be appreciated by one of skill in the art, the communication network 108 may form the communication channel between two or more communication terminals 104 in communication with one another. Furthermore, it should be appreciated that a portion or portions of the communication network 108 may comprise analog and/or switched circuit networks, such as the public switched telephone network (PSTN), and that at least a portion of the communication network 108 comprises an IP communication network. As can also be appreciated by one of skill in the art, where an Internet protocol (IP) communication network 108 comprises a portion of a communication link proximate to a communication terminal 104, such a communication terminal 104 may comprise an IP telephone, video phone or computer.

Figure 2:
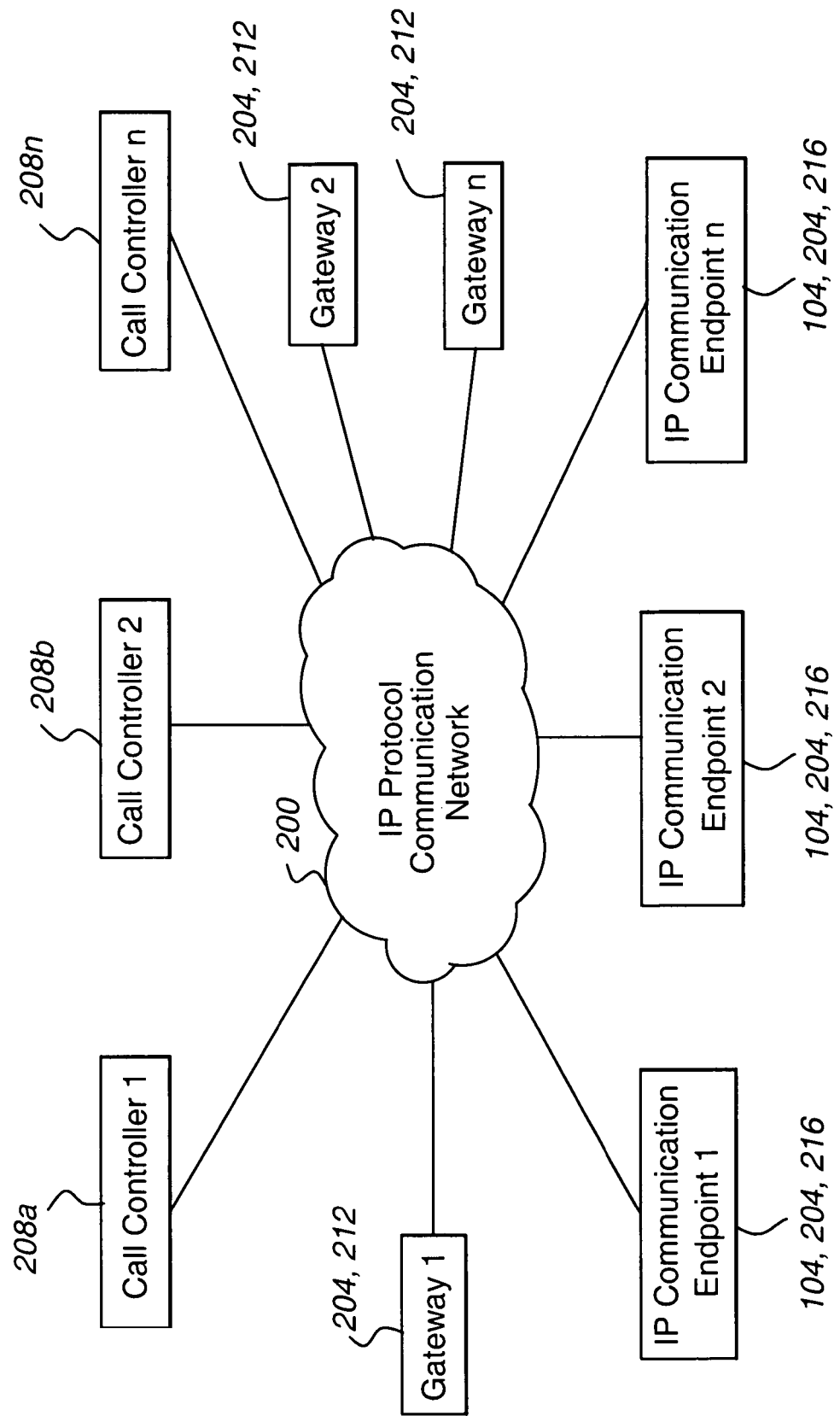
FIG. 2 depicts the relationship of clients and call controllers in accordance with an embodiment of the present invention.

With reference now to FIG. 2, the relationships between various clients 204 and call controllers 208 associated with an IP protocol communication network 200 are illustrated. In particular, as shown in FIG. 2, the clients 204 are generally interconnected to the call controllers 208 through the IP protocol communication network 200. As can be appreciated by one of skill in the art, the IP protocol communication network 200 may comprise all or part of the communication network 108, and thus the arrangement depicted in FIG. 2 may comprise all or a portion of the system 100 illustrated in FIG. 1. Communications between clients 204 across the IP protocol communication network 200 may be in accordance with various communication protocols, including the H.323 protocol.

The clients 204 may be of various types. For example, as illustrated in FIG. 2, clients 204 may comprise one or more gateways 212. In general, a client 204 comprising a gateway 212 provides for an interconnection between a communication endpoint 104 (or to a non-IP protocol network) that is not capable of direct interconnection to the IP protocol communication network 108. Furthermore, the connection between a gateway 212 and a non-IP protocol communication endpoint 104 may be made through a direct interconnection, such as may be established over a switched circuit network.

A client 204 may additionally or alternatively comprise a communication terminal 104 capable of directly interconnecting to the IP communication network, referred to herein as an Internet protocol (IP) communication endpoint 216. In general, an IP communication endpoint 216 is capable of direct interconnection to the IP protocol communication network 108. Accordingly, examples of IP communication endpoints 216 include IP telephones or video phones, implemented either as hardware (e.g., an IP telephone) or as software (e.g., a soft phone) running in connection with a general purpose computer, computers that are operable to provide real-time audio, video, and/or data communications, or any other data endpoint.

The call controllers 208 are network nodes that function to facilitate or enable communications between clients 204 of the IP protocol communication network 200 to which the controllers 208 and clients 204 are interconnected. In particular, the call controllers 208 maintain call state information. Examples of call state information includes SIP and H.323 call state information generated in connection with real-time communications over an IP protocol communication network 200. For instance, call state information may include call setup, tear down, address translation, and billing information. The call controllers 208 also function to control access to the IP protocol communication network 200. As can be appreciated by one of skill in the art, in a typical arrangement, a call controller 208 may function or be assigned as a primary call controller with respect to one or more clients 204. Alternatively or in addition, a call controller 208 can function as an alternate call controller for a number of communication endpoints 204.

Figure 3:
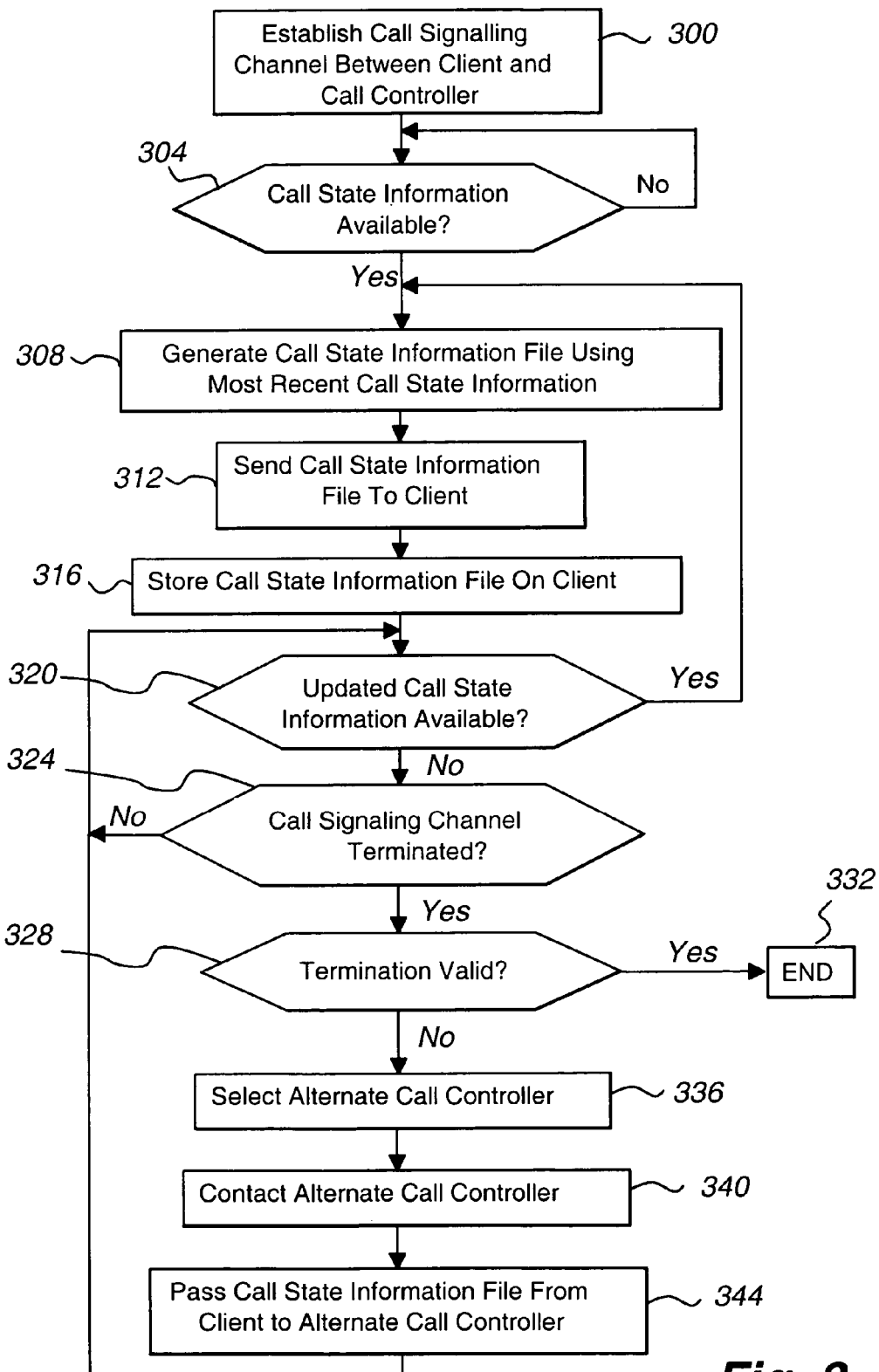
FIG. 3 is a flow diagram illustrating the operation of a system in accordance with an embodiment of the present invention.

With reference now to FIG. 3, the operation of a system in accordance with an embodiment of the present invention is illustrated. Initially, at step 300, a call signaling channel is established between a client 204 and a call controller 208. For example, a user associated with a first communication endpoint 104 comprising an IP communication endpoint 216 may request that a communication channel (i.e., a call) be established with a second communication endpoint 104. In connection with the request for a communication channel, the call signaling channel will be established between the client 204 and the call controller (e.g., first call controller 208a).

At step 304, a determination is made as to whether call state information is available. In general, call state information may comprise any information related to the communication channel itself, or to peripheral data associated with the communication channel. For example, call state information may identify the various endpoints associated with the communication channel, whether a communication endpoint 104 has been placed on hook, and call timer information. If no call state information is available, the system may idle at step 304. If call state information is available, a call state information file is generated using the most recent call state information (step 308). The call state information file is then sent to the client 204 (step 312). In general, the call state information file is sent to each client 204 that has established a call signaling channel with the call controller 208 and that is associated with the communication channel in connection with which the call state information has been generated. As can be appreciated by one of skill in the art, while a communication channel is being set up or established, call state information may exist that is not associated with an established communication channel. However, such information may be maintained in a call information file in accordance with the present invention, in order to facilitate establishment of a requested communication channel should the client 204 become disconnected from an assigned controller 208. As can also be appreciated by one of skill in the art, the call controller 208 may, in addition to providing a file containing call state information to the client 204, maintain call state information conventionally. Examples of such state information include coverage timers, forwarding status, login status, previous connections to other parties, override code used on the call, call park information. In general any feature related information to the user on the call is stored, as well as any call specific information on what happened to the call or is allowed to happen to the call.

At step 316, the call state information file is stored on the client 204. Accordingly, a copy of the call state information, as represented by the call state information file, is directly accessible to the client 204. However, it should be appreciated that the client 204 is not required to maintain any awareness of the format or contents of the call state information file.

At step 320, a determination is made as to whether updated call state information is available. If updated call state information is available, the system returns to step 308. If updated call state information is not available, a determination is made as to whether the call signaling channel between the client 204 and the call controller 208 has been terminated (step 324). If the call signaling channel has not been terminated, the system returns to step 320. If the call signaling channel has been terminated, a determination is next made as to whether the termination of that call signaling channel is valid (step 328). If the termination is determined to be valid, the procedure ends. An example of a valid termination is after the client 204 has gone on hook and the associated communication channel has been torn down.

If the termination of the call signaling channel was determined at step 328 to be invalid, an alternate call controller is selected (step 336). For example, the client 204 may select an alternate call controller 208 from a list of valid alternate call controllers 208 maintained on the client 204 or accessible to the client 204 over the IP protocol communication network 108. As can be appreciated by one of skill in the art, if the alternate call controller 208 that is initially selected is not available, a next call controller 208 may be selected. As a further example, the client 204 may broadcast a request for a call controller 208, and may select a responding call controller 208 as an alternate-call controller 208. At step 340, the client 204 contacts the alternate call controller 208. The call state information file is then passed from the client 204 to the alternate call controller 208 (step 344). The call state information file may be passed to the alternate call controller 208 by the client 204 as part of or in connection with establishing contact with the alternate call controller 208. Furthermore, the call state information file may be pushed to the alternate call controller 208 by the client 204. Alternatively, the call state information file may be provided to the alternate call controller 208 in response to a query for that file made by the alternate call controller 208.

After the call state information has been provided to the alternate call controller 208, the system may return to step 320. Furthermore, provided that information concerning all of the applicable call features in effect immediately prior to the loss of the call signaling channel with the primary or prior call controller 208 is contained in the call information file, all of those features may be maintained, even though the call has migrated from the primary call controller 208 to an alternate call controller 208.

Although the discussion provided herein has primarily described the use of call state information files to maintain call features associated with communication channels where a call signaling channel is lost, it should be appreciated that the present invention is not so limited. For example, the present invention may also be used to maintain call features applicable to a communication channel where a connection between a client 204 and a call controller 208 is intentionally brought down. For instance, the present invention may be used to maintain call features associated with communication channels in existence at the time that a call controller 208 is removed from service for maintenance or upgrading.

Furthermore, it should be appreciated that the present invention may be applied in connection with any IP real-time transfer protocol (RTP) stream. Therefore, although the description provided herein refers to calls and to the use of call controllers, it should be appreciated that the present invention is not limited to voice telephony applications.

The present invention, by applying a "cookie" type technique in order to save call state information increases the natural network reliability by distributing such information. In addition, the disclosed invention is highly scalable, as clients 204 store their own call state information, avoiding the need for sending updated call information to a central database or to alternate call controllers. Further, call state information is only sent to alternate controllers when such information is needed. In addition, the disclosed invention is simple to implement and requires relatively few resources. Also, because embodiments of the present invention do not require that clients 204 be capable of recognizing the content of call state information files, changes can be made to the structure and content of these files, without requiring changes to the clients 204. Instead, only call controllers 208 need to be capable of reading the content of the call state information files.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best mode presently known of practicing the invention and to enable others skilled in the art to utilize the invention in such or in other embodiments and with various modifications required by their particular application or use of the invention. It is intended that the appended claims be construed to include the alternative embodiments to the extent permitted by the prior art.

What is claimed is:

1. A method for maintaining call state information, comprising:
   generating in a first call controller first call state information;
   creating at least a first file containing a representation of at least some of said generated first call state information;
   providing said at least a first file to a first client;
   storing said at least a first file on said first client, wherein said first client is a communication endpoint participating in a call to which said first call state information pertains;
   establishing a call signaling channel between said first call controller and said first client;
   losing said call signaling channel;
   generating in said first client a request for service from a second call controller; and
   after losing said call signaling channel, providing said at least a first file from said first client to said second call controller.

2. The method of claim 1, wherein said at least a first file includes most recent call state information.

3. The method of claim 1, further compromising:
   generating in said first call controller second call state information;
   creating at least a second file containing a representation of at least some of said generated second call state information; and
   providing said at least a second file to said first client.

4. The method of claim 1, further comprising:
   establishing a call between said first client and a second client.

5. A method for maintaining call state information, comprising:
   generating in a first call controller first call state information;
   creating at least a first file containing a representation of at least some of said generated first call state information;
   providing said at least a first file to a first client;
   storing said at least a first file on said first client, wherein said first client is a communication endpoint participating in a call to which said first call state information pertains;
   establishing a call signaling channel between said first call controller and said first client;
   losing said call signaling channel;
   generating in said first client a request for service from a second call controller; and
   providing said at least a first file from said first client to said second call controller, wherein said providing said at least a first file to said second call controller is performed after receiving at said first client a query from said second call controller for said at least a first file.

6. A system for providing redundant call state information, comprising:
   a first communication endpoint, including first data storage;
   a first call controller in communication with said first communication endpoint, wherein call state information is provided by said first call controller to said first communication endpoint, and wherein said call state information for a call between said first communication endpoint and another device is stored in at least said first data storage of said first communication endpoint;
   a second call controller in communication with said first communication endpoint, wherein said call state information is provided by said first communication endpoint to said second call controller after a failure of said first call controller.

7. The system of claim 6, further comprising:
   a second communication endpoint, wherein said call state information is related to a communication channel established between said first and second communication endpoints.

8. The system of claim 6, further comprising an Internet protocol network.

9. The system of claim 6, wherein said first communication endpoint comprises an IP telephone.

10. The system of claim 6, wherein said first call controller comprises a real time protocol call controller.

11. A method for providing redundant signaling information, comprising:

generating in a first call controller first call state information;

providing said first call state information to a first communication endpoint;

storing said first call state information on said first communication endpoint; and in response to a requirement to switch service from said first call controller to a second call controller, providing said first call state information from said first communication endpoint to said second call controller.

12. The method of claim 11, wherein said first communication endpoint comprises an Internet protocol communication endpoint.

13. The method of claim 11, further comprising:

generating in said first call controller second call state information; and providing said second call state information to said first communication endpoint.

14. The method of claim 11, further comprising:

establishing a first communication channel between said first communication endpoint and a second communication endpoint; and providing second call state information to said second communication endpoint.

15. The method of claim 14, wherein said second call state information comprises at least a portion of said first call state information.

16. The method of claim 11, wherein said first call state information is related to a first communication channel.

17. A method for providing redundant signaling information, comprising:

generating in a first call controller first call state information;

providing said first call state information to a first communication endpoint;

storing said first call state information on said first communication endpoint;

in response to a requirement to switch service from said first call controller to a second call controller, generating a request to said second call controller for service; and providing said first call state information from said first communication endpoint to said second call controller, wherein said providing said first call state information to said second call controller is performed in response to a request from said second call controller for call state information.

18. A system for providing redundant signaling information, comprising:

first means for controlling features associated with a first communication channel;

first communication client means, wherein said first communication client means is a communication endpoint;

means for interconnecting said first means for controlling features associated with a first communication channel to said first communication client means; and means for storing in said first communication client means first communication channel state information related to said first communication channel, wherein said first communication channel state information related to said first communication channel is stored in said means for storing in said first communication client means, wherein said first communication channel state information is generated by said first means for controlling features associated with a first communication channel, and wherein said first communication channel interconnects said first communication client means to a second communication client means;

second means for controlling features associated with a first communication channel, wherein in response to a loss of a call signaling channel between said first means for controlling features associated with a first communication channel and said first communication client means said first communication channel state information is provided from said first communication client means to said second means for controlling features associated with a first communication channel.

* * * * *